(No Model.)

J. S. HAINSWORTH.
HORSE COLLAR.

No. 591,758. Patented Oct. 12, 1897.

Witnesses
James Fleming
Benjamin Clark

Inventor
John Smith Hainsworth
per C. Eaton.
His Attorney.

UNITED STATES PATENT OFFICE.

JOHN S. HAINSWORTH, OF LONDON, ENGLAND.

HORSE-COLLAR.

SPECIFICATION forming part of Letters Patent No. 591,758, dated October 12, 1897.

Application filed February 1, 1897. Serial No. 621,538. (No model.)

*To all whom it may concern:*

Be it known that I, JOHN SMITH HAINSWORTH, a subject of the Queen of Great Britain, and a resident of London, England, have invented certain new and useful Improvements in Horse-Collars, of which the following is a full, clear, and exact specification.

This invention relates to improvements in horse-collars, the object being to prevent undue strains, friction, and rubbing upon the withers and top of the neck of a horse or animal when in harness. With the use of horse-collars as now constructed soreness is produced about the withers owing to the constant rubbing or friction of the collar thereon.

In order to overcome this objection, I so construct the collar and support same as to prevent this rubbing or friction upon the withers, and the same is carried out as follows, reference being had to the annexed drawings, in which—

Figure 1:
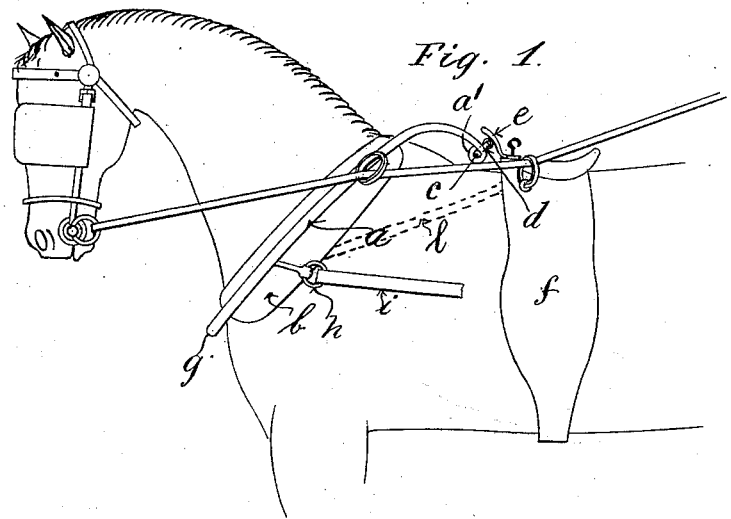
Figure 2:
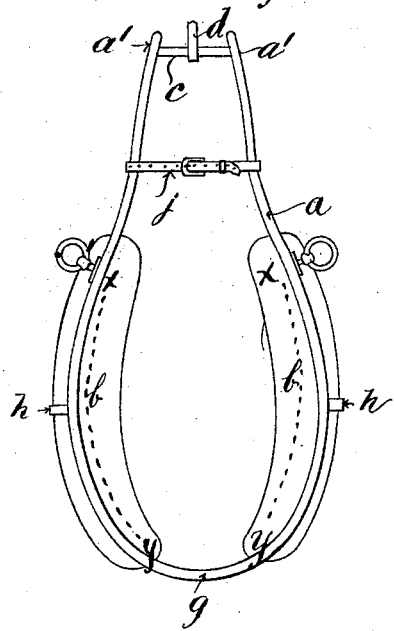
Figure 3:
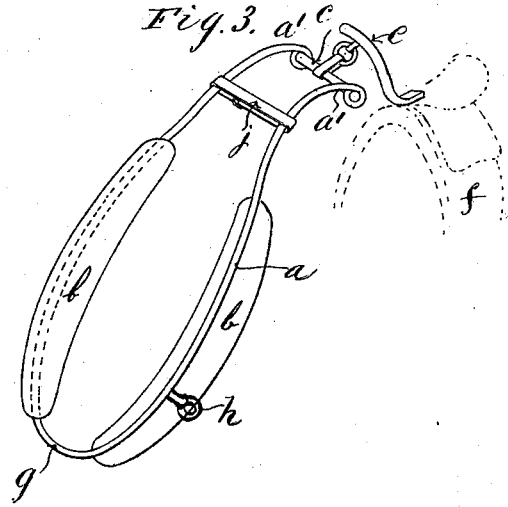

Figure 1 is a side elevation of a horse, showing my improved collar in position; Fig. 2, a front elevation of collar removed; Fig. 3, a perspective view of same.

$a$ is the frame of the collar, which is formed of metal tube or other suitable material, which is shaped as shown and carries the pads $b$, secured to the metal frame $a$ in any convenient manner. The ends $a'$ of the metal frame $a$ are connected together by means of the bar or rod $c$.

$d$ is a strap or the like, which is attached to the bar $c$ and also to the projection $e$ upon the saddle $f$. The part $g$ of the frame is free from padding and does not touch the throat or windpipe of the horse, which is thus left free, the pulling strains being confined between the points $x$ and $y$.

$h$ are the trace-rings, to which the traces $i$ are attached.

$j$ is a strap or the like for keeping the ends $a'$ of the frame the required distance from each other when adjusting the collar upon the animal.

Suitable straps $l$ or the like may be employed for strengthening the collar $a$ when used in double harness.

When required, any convenient means may be employed at or about the points $g$ for the purpose of attaching a pole-chain thereto.

I may, if desired, form the frame $a$ in two parts, which may be hinged or jointed at or about the points $g$.

Although I have for purpose of illustration shown a strap for securing the ends of the collar-frame to the saddle, I do not confine myself to this particular arrangement, as various well-known and convenient means may be employed for this purpose.

Having thus described my invention, what I claim, and desire to secure by Letters Patent, is—

A horse-collar comprising a frame having applied to the inner sides thereof pads adapted to bear on the shoulders of the horse, the frame being unpadded on the upper and lower ends whereby the throat and neck of the horse are free from contact therewith, the upper ends of said frame being extended and curved backward and secured to the harness-saddle, whereby the collar is supported from said harness-saddle, substantially as described.

In testimony that I claim the foregoing I have hereunto set my hand this 6th day of January, 1897.

JNO. S. HAINSWORTH.

Witnesses:
 JAMES STEMING,
 H. D. HOSKINS.